United States Patent
Mela et al.

(10) Patent No.: US 7,656,847 B2
(45) Date of Patent: Feb. 2, 2010

(54) METHOD AND APPARATUS FOR UTILIZING BLUETOOTH FOR WLAN SERVICE AUTHENTICATION AND DISCOVERY

(75) Inventors: Martti Mela, Helsinki (FI); Kai Vehmanen, Helsinki (FI); Teemu Jalava, Espoo (FI)

(73) Assignee: Nokia Corporation, Espoo (FI)

( * ) Notice: Subject to any disclaimer, the term of this patent is extended or adjusted under 35 U.S.C. 154(b) by 579 days.

(21) Appl. No.: 10/880,363

(22) Filed: Jun. 29, 2004

(65) Prior Publication Data
US 2005/0286478 A1 Dec. 29, 2005

(51) Int. Cl.
H04W 4/00 (2006.01)
H04B 7/00 (2006.01)
H04B 5/00 (2006.01)
(52) U.S. Cl. .................. 370/338; 455/41.2; 455/41.1
(58) Field of Classification Search ............ 370/338; 455/41.1, 41.2
See application file for complete search history.

(56) References Cited

U.S. PATENT DOCUMENTS 6,662,224 B1* 12/2003 Angwin et al. ............. 709/224
6,879,584 B2* 4/2005 Thro et al. .................. 370/352
6,981,029 B1* 12/2005 Menditto et al. ............ 709/217
2001/0033554 A1* 10/2001 Ayyagari et al. ............ 370/328
2005/0193106 A1* 9/2005 Desai et al. ................. 709/223

FOREIGN PATENT DOCUMENTS

WO 0145319 6/2001

OTHER PUBLICATIONS

A. Palin et al., "Method and System for Establishing a Wireless Communications Link", U.S. Appl. No. 10/660,544, filed Sep. 12, 2003.

* cited by examiner

Primary Examiner—Vincent P Harper
Assistant Examiner—Marivelisse Santiago-Cordero (57) ABSTRACT

A device having wireless connectivity may be coupled to Internet Protocol (IP) service available in a network, including a wireless local area network (WLAN), local area network (LAN), Ethernet or other suitable Internet access point, by broadcasting a wireless protocol service discovery query requesting information about the IP service available in the network and waiting for a reply from another device having wireless connectivity in the network. The device includes a wireless protocol service discovery query module that broadcasts the wireless protocol service discovery query and waits for the reply from the second device. The scope of the invention also includes a network having such devices with the features described above, as well as a computer program product with a program code that is stored on a machine readable carrier, for carrying out the steps according to the aforementioned method when the computer program is run in a processor module of the first device.

43 Claims, 4 Drawing Sheets

METHOD AND APPARATUS FOR UTILIZING BLUETOOTH FOR WLAN SERVICE AUTHENTICATION AND DISCOVERY

BACKGROUND OF THE INVENTION

1. Field of Invention

The present invention relates to a method and apparatus for a device having wireless connectivity to determine the availability of Internet Protocol (IP) service in a network; and more particularly, for a Bluetooth-enabled device to determine the availability of IP service in a wireless local area network (WLAN) service usage.

2. Description of Related Art

In the prior art, some services, like a display remote from a keyboard or loudspeakers remote from a laptop, have very localized wireless connectivity. In an environment where multiple wireless systems exist in a network, the discovery of available services is typically difficult if the coverage of such a network is large. This is particularly true in a WLAN. Bluetooth (BT) wireless connectivity protocol provides for coverage of one device, but its range is presently limited to a radius of about 10-100 meters.

As a technology, a WLAN does not provide services capable of application layer service discovery. However, the BT wireless connectivity protocol has this functionality, and the typical BT wireless connection between a phone and either a laptop or headset is a very straightforward and common service. Document no. WO/0145319 provides one known example of a BT link arrangement, and describes a situation where a first short-range link (e.g RFID) is used for identification and authentication when entering a second short range link (e.g. BT). The reader is also referred to U.S. patent application Ser. No. 10/660,544 (Nokia Reference no. NC28897), where through a first short-range link (of first type) it is determined whether a remote device is capable of supporting a second short-range link (of second type). Also information is exchanged via the first link to establish the second link. U.S. patent application Ser. No. 10/660,544 covers a situation where radio parameters are exchanged over the first link, which is BT-enabled.

In a case where a WLAN is utilized to transfer high quality audio or video from a terminal to a receiving end, the capabilities of both parties need to be negotiated. If the office environment consists of 100 WLAN terminals, it is difficult to choose the proper receiving end. The service discovery in a static or non ad hoc network is also difficult and the WLAN does not provide applicable means for that. Also, in a situation where the receiving end has access to the WLAN through an Access Point, it is problematic to determine its location.

Finally, the bandwidth of a BT network is very limited and therefore transfer of high quality real time audio or video utilizing the BT network is not practical.

SUMMARY OF INVENTION

The basic idea of the present invention is to combine the usage of the BT service discovery to WLAN service usage. The invention provides a method for discovering IP-services reachable via some IP-network. According to the present invention, for example, a BT-enabled device can use the Service Discovery Application Profile (SDAP) to discover another BT-enabled device capable of being connected to the Internet through a WLAN, Ethernet, or other suitable network. In order to implement the present invention, a BT connection and a generic IP connection between a client and the device providing the IP-services are all that is needed. The SDAP will provide the BT-enabled device with the service IP address and port numbers for connection to the Internet. The present invention provides for sharing information about available services (from a device offering service to possible host devices). Information may be provided, e.g. the IP address of a serving device, so that the BT-enabled device can be used via the WLAN/LAN to access the IP services available in a network. In particular, parameters exchanged may include those needed for the 'IP-service' (i.e. URL plus the name of the service or some other free format text field), so that the terminal may connect to the service via WLAN (or any other IP-access).

For example, in the proximity of a service, BT is used to negotiate the authorization and authentication of the IP service, for example by using BT to negotiate parameters needed to establish a wireless WLAN connection. Mainly, IP addresses and ports of a proximity service are announced to a wireless BT and WLAN-enabled device. After the BT service discovery (and negotiation), the BT-enabled device is able to start transferring data between the proximity service by using the WLAN. The proximity services include a remote screen, display, loudspeakers, etc.

This method to uniquely combine the BT's SDAP to WLAN service usage is the main thrust of the present invention. After receiving the service information, the BT-enabled device will access the IP service. The BT-enabled device mobile may include a mobile phone, a mobile terminal, user equipment, a laptop computer, a notebook computer, a desktop computer, etc.

This procedure can be further enhanced by using the Generic Access Profile (GAP) functionality with BT. The GAP will be utilized to authorize the mobile device to use the IP service.

One advantage of the present invention is that it removes the need for a proximity WLAN service discovery and authentication of parties, because BT has these features built-in.

Another advantage of the present invention is that it also works in certain scenarios where a WLAN based discovery would otherwise fail. For example, one such case is where the service user is connected via WLAN, but the device hosting the service is not. The host device still has LAN (wire Ethernet) and BT connectivity. In this case, scanning for WLAN devices in close proximity would not result in finding all nearby services.

In summary, the present invention provides a new and unique method and apparatus for a device having wireless connectivity to determine the availability of Internet Protocol (IP) service in a network, including a wireless local area network (WLAN), local area network (LAN), Ethernet or other suitable Internet access point, wherein the device broadcasts a wireless protocol service discovery query requesting information about the IP service available in the network and waits for a reply from another device having wireless connectivity in the network.

Moreover, the device includes a wireless protocol service discovery query module that broadcasts the wireless protocol service discovery query and waits for the reply from the other device. The scope of the invention also includes a network having such devices having the features described above, as well as a computer program product with a program code that is stored on a machine readable carrier, for carrying out the steps according to the aforementioned method when the computer program is run in a processor module of the first device.

BRIEF DESCRIPTION OF THE DRAWING

The drawing, not drawn to scale, includes the following Figures.

DETAILED DESCRIPTION OF INVENTION

Figure 1:
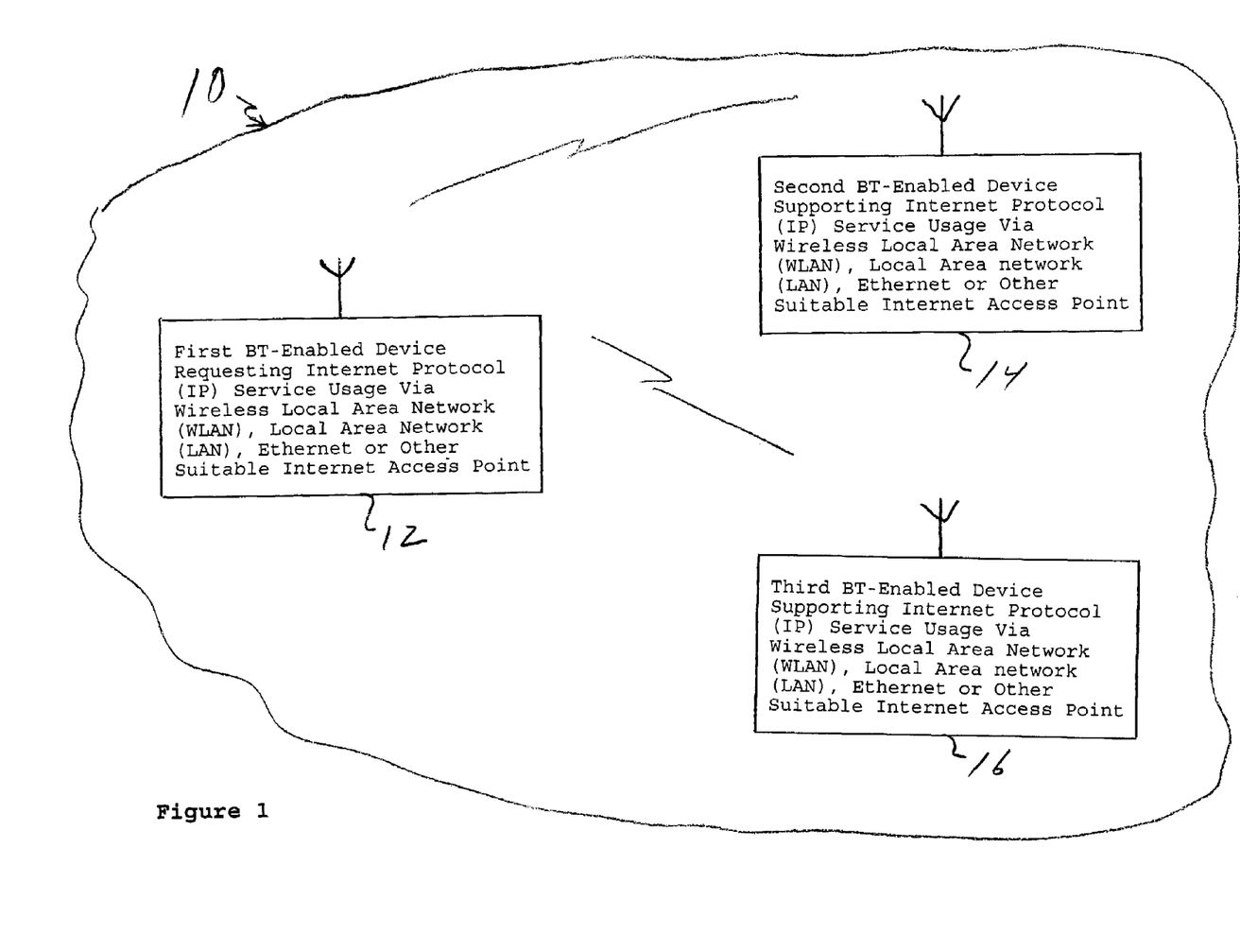
FIG. 1 shows a diagram of a first BT-enabled device requesting Internet Protocol (IP) service usage via a Wireless Local Area Network (WLAN), Local Area Network (LAN), Ethernet or other suitable internet access point and a second BT-enabled device supporting IP service usage via the same according to the present invention.

FIG. 1 shows a network generally indicated as 10 having a first BT-enabled device 12 that broadcasts a wireless protocol service discovery query requesting information IP service usage available via WLAN, LAN, Ethernet or other suitable internet access point in the network, and also having second or third BT-enabled devices 14, 16 supporting IP service usage via the same. In one case, the second BT-enabled device 14 may reply to the first BT-enabled device 12 and support the IP service usage for the same. In another second case, the second BT-enabled device 14 may reply to the first BT-enabled device 12 and provide information about the third device that can support the IP service usage for the first BT-enabled device 12. The scope of the invention is not intended to be limited to which device 14, 16 replies and/or supports the IP service usage for the first BT-enabled device 12.

Moreover, the invention is described by way of example using the BT wireless connectivity protocol, although the scope of the invention is intended to include one or more other types of wireless connectivity protocols. The BT-enabled devices 12, 14, 16 may be a mobile terminal, a mobile phone, user equipment, as well as a laptop, notebook computer, desktop computer, etc., having wireless connectivity, which are all known in the art. The network may also include one or more other BT-enabled devices, and/or non-BT-enabled devices which are not shown or described since they do not form part of the underlying invention.

In operation, the reply from the BT-enabled device 14 or 16 may include information about an IP address of a serving device to be used via the network. The BT-enabled devices may exchange information needed for the IP service, including a URL plus the name of a service or some other free format text field, so that the first device may connect to the IP service via the network.

It is important to note that, in addition to the standard BT attributes used to describe services such as "Service Name" and "Service Description", a new field may be created called, for example, "Related URL". This would basically be a new Bluetooth Service Attribute type, for which clients will search during the discovery process according to the present invention. Once the 'Related URL' is acquired over Bluetooth, the client is ready to start using the service over the generic IP Network. (One example of how the invention can be used to deploy services includes the following: This URL (as defined in RFCs 1738 and 1808), in addition to network address and protocol information, can contain a session-key that can be used by the device providing the service to associate IP and BT connections.)

After receiving information from the BT-enabled device 14 or 16, the BT-enabled device 12 may be coupled to the IP service via the network.

The BT-enabled devices 14 or 16 may provide protocol identifiers, IP addresses, ports and optional service specific parameters of a proximity server to the device 12. After receiving the protocol identifiers, IP addresses, ports and optional service specific parameters of the proximity server, the BT-enabled device 12 may start a transfer of data between the proximity server via the WLAN, LAN, Ethernet or other suitable Internet access point in the network. The proximity services may include a remote screen, a display, loudspeakers or other suitable device accessible as an IP-service.

Figure 2:
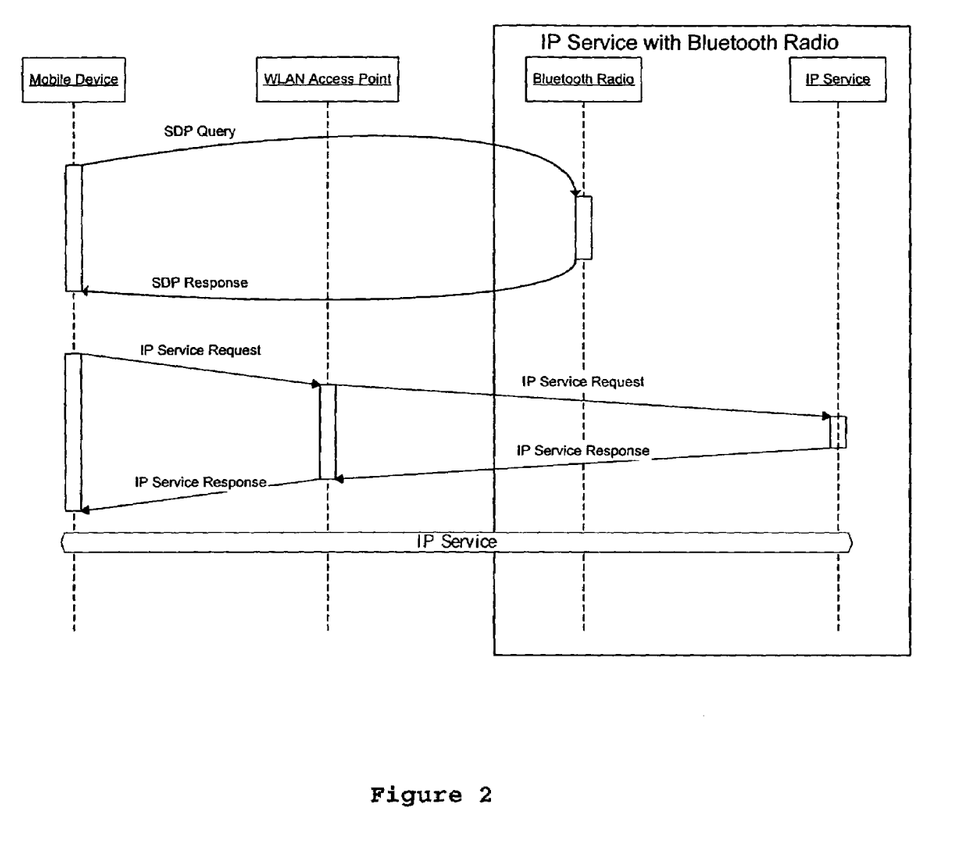
FIG. 2 shows a diagram of steps related to a BT-enabled proximity service according to the present invention.
Figure 3:
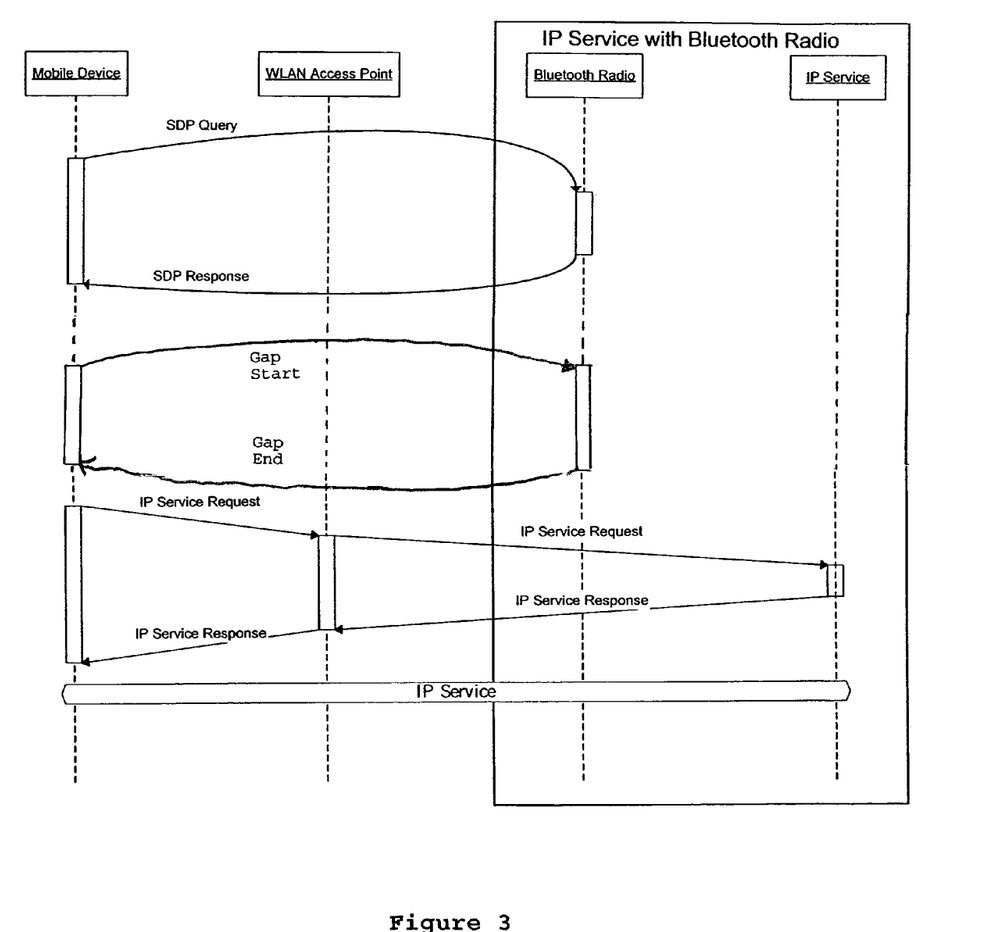
FIG. 3 shows a diagram of steps related to a BT-enabled proximity service, including mobile device authorization according to the present invention.

FIGS. 2-3

FIG. 2 shows steps related to coupling the BT-enabled mobile device 12 to the available proximity service. First, the mobile device 12 broadcasts a wireless protocol service discovery query (SDAP start) requesting information about the IP service available in the network and waits for a reply, initiating an exchange of SDAP messages informing the mobile device 12 of the capabilities of the BT-enabled service. Next, in order to utilize the proximity services of the BT-enabled service by using the WLAN, the BT-enabled mobile device 12 provides a service query (IP) to the WLAN access point, which provides a service response (IP).

FIG. 3 shows steps related to coupling the BT-enabled mobile device 12 to the available proximity service similar to FIG. 2, only enhanced with mobile device authorization via BT. As shown, after the exchange of SDAP messages, the mobile device 12 provides a Generic Access Profile (GAP) start message, initiating an exchange of GAP messages that authenticate and authorize the mobile device 12 to use the BT-enabled services.

BT-Enabled Device 20

Figure 4:
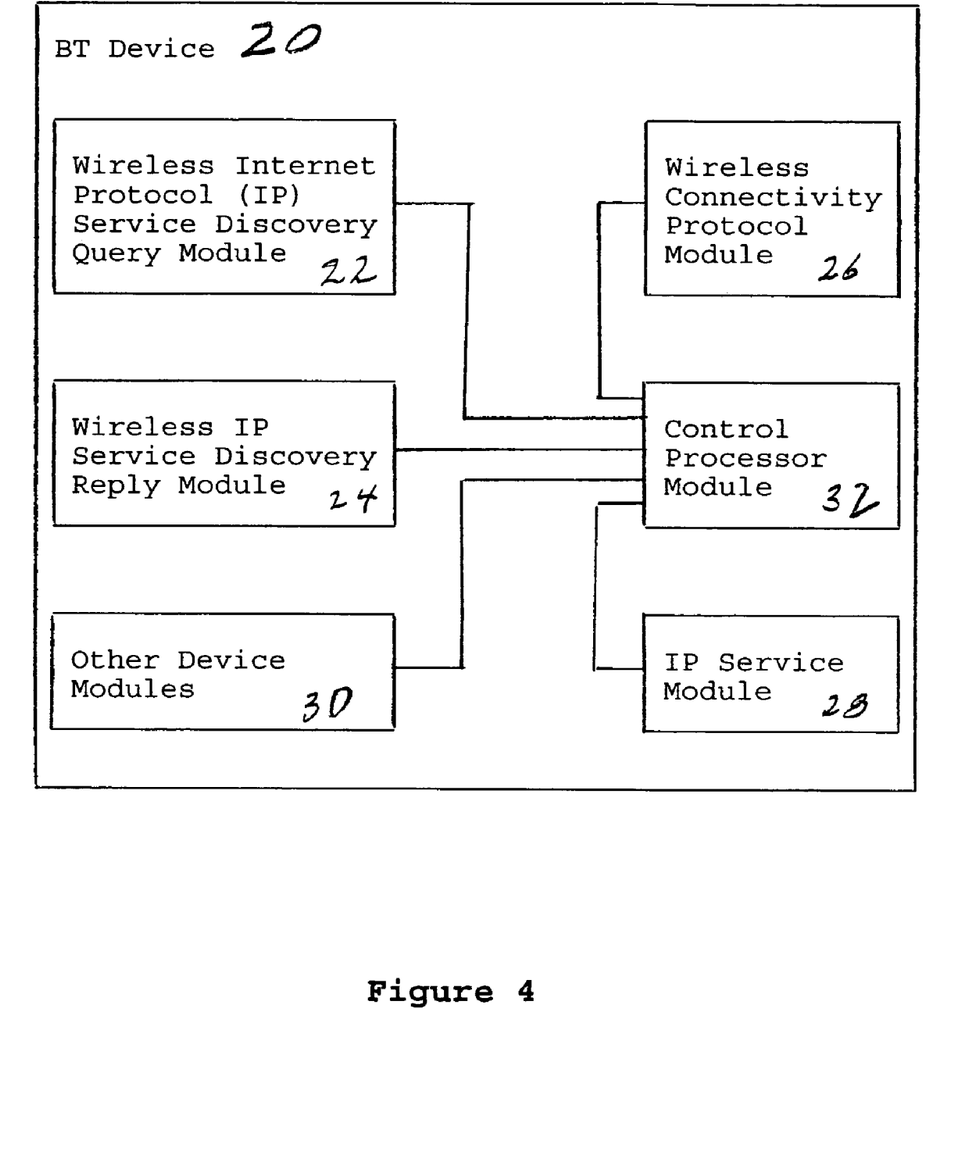
FIG. 4 includes a block diagram of a BT-enabled device similar to that shows in FIG. 1 according to the present invention.

FIG. 4 shows, by way of example, a BT-enabled device 20 similar to devices 12, 14, 16 shown in FIG. 1, according to the present invention. The BT-enabled device 20 may include a wireless IP Service discovery query module 22, a wireless IP Service discovery reply module 24, a wireless connectivity module 26, an IP module 28, other device modules 32 known in the art, as well as a control processor 30 for handling the control of the same. In operation, in the first BT-enabled device 12, the wireless IP Service discovery query module 22 would broadcast a wireless protocol service discovery query requesting information about the IP service available in the network and wait for a reply from another BT-enabled device having wireless connectivity in the network. In the second BT-enabled device 14 or 16 (FIG. 1), the wireless IP Service discovery reply module 24 would respond to the wireless protocol service discovery query and provide the reply containing information about the IP service available in the network, consistent with that discussed above. The wireless connectivity protocol module 26 handles all other functionality related to the Bluetooth connection that is known in the art, including the GAP functionality discussed above. The IP service module 28 handles the IP service functionality related to the IP service available in the network that is known in the art, consistent with that discussed above, including connecting to the IP related services. The other device modules 32 may include other modules typically in the device that are known in the art but do not necessarily form part of the basic invention disclosed herein, including a keyboard module, a display module, input/output modules, etc. Finally, the control processor module 32 handles the functionality related to the control of the overall device that is known in the art, including controlling the functionality of modules 22, 24, 26, 28, 30 consistent with that discussed above. Finally, the scope of the invention is not intended to be limited to performing any of the aforementioned functionality in any one of the aforementioned modules. Embodiments are envisioned in which the aforementioned functionality is performed in one or more of the aforementioned modules. The scope of the invention is not intended to be limited to how or where the aforementioned functionality is implemented.

The functionality of the modules 22, 24, 26, 28, 30 and/or 32 may be implemented alone or in combination using hardware, software, firmware, or a combination thereof. In a typical software implementation, the modules 22, 24, 26, 28, 30 and/or 32 would be one or more microprocessor-based architectures having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation. The scope of the invention is not intended to be limited to any particular implementation using technology known or later developed in the future.

SCOPE OF THE INVENTION

The scope of the invention is not intended to be limited to any specific kind of receiving node, user equipment, mobile terminal, phone or devices, and many different mobile terminals or device, including laptop or notebook computers, are envisioned that may contain the fundamental features of the present invention described herein.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A method comprising:
   transmitting from a first device over a first short-range radio link using a first short-range communicating protocol a wireless protocol service discovery query requesting information about an Internet Protocol based service available within a wireless network;
   receiving a reply to the wireless protocol service discovery query from a second device connected to the wireless network over the first short-range radio link using the first short-range communication protocol, the reply including at least an Internet Protocol address of a particular node, point, terminal or device providing the Internet Protocol based service within the wireless network;
   negotiating parameters needed for establishing communications with the particular node, point, terminal or device providing the Internet Protocol based service within the wireless network over a second short-range radio link using a second short-range communication protocol with said second device over the first short-range radio link; and
   transmitting a service query including at least the received Internet Protocol address for establishing communications with the particular node, point, terminal or device providing the Internet Protocol based service within the wireless network, wherein the service query is transmitted over the second short-range radio link using the second short-range communications protocol in accordance with the negotiated parameters, wherein the second short-range communication protocol is different than the first short-range communication protocol.

2. A method according to claim 1, wherein the first device and the second device exchange information needed for the Internet Protocol based service, including a Universal Resource Locator plus the name of a service or some other free format text field, so that the first device may connect to the Internet Protocol based service via the wireless network.

3. A method according to claim 1, wherein the method includes using the short-range communication protocol for providing wireless connectivity between a first enabled device and a second enabled device.

4. A method according to claim 1, wherein the method includes coupling the first device to the Internet Protocol based service based on the information received from the second device.

5. A method according to claim 1, wherein the second device provides a protocol identifier, Internet Protocol addresses, ports and service specific parameters of a proximity server to the device.

6. A method according to claim 5, wherein the first device starts a transfer of data between the proximity server via the wireless network.

7. A method according to claim 5, wherein proximity services of the proximity server include a remote screen, a display, loud-speakers or other suitable device accessible as the Internet Protocol based service.

8. A method according to claim 1, wherein the first short-range communication protocol is short range wireless connectivity protocol and a Generic Access Profile is used to authorize an enabled device to use the Internet Protocol based service.

9. A method according to claim 1, wherein the first device is either a mobile terminal, a mobile phone, user equipment, a laptop, a notebook computer, a desktop computer or other suitable device.

10. A method according to claim 1, wherein the method includes combining a service discovery application protocol of a short range wireless connectivity protocol to service usage of the wireless network.

11. A method according to claim 1, wherein a wireless connectivity protocol is used to negotiate an authorization and authentication of the Internet Protocol based service, including Generic Access Profile functionality.

12. A method according to claim 11, wherein the first short-range communication protocol is a short range wireless connectivity protocol.

13. A method according to claim 1, wherein the particular node, point, terminal or device is an Internet Protocol service user connected via the wireless network to a host device that is not connected to the wireless network.

14. A method according to claim 1, wherein the method further comprises implementing the method, including determining in the first device having wireless connectivity the availability of Internet Protocol based service in the wireless network;

transmitting from the first device, using the first short-range communication protocol, the wireless protocol service discovery query requesting information about the Internet Protocol based service available within the network;

receiving with a first radio the reply from the second device having wireless connectivity in the wireless network; and transmitting the service query including at least the received Internet Protocol address for initiating communications with the particular node, point, terminal or device proving the Internet Protocol based service using a second radio and the second short-range communication protocol, or some combination thereof, via a computer program running in a respective controller in each device.

15. A computer program product with a program code, which program code is stored on a machine readable medium encoded with a computer program, for carrying out the steps according to claim 1 when the computer program is run in a processor module of a first device.

16. A device comprising:
one or more modules configured to
transmit over a first short-range radio link using a first short-range communication protocol a wireless protocol service discovery query requesting information about an Internet Protocol based service available within a wireless network;
receive a reply to the wireless protocol service discovery query from a second device connected to the wireless network over the first short-range radio link using the first short-range communication protocol, the reply including at least an Internet Protocol address of a particular node, point, terminal or device providing the Internet Protocol based service within the wireless network;
negotiate parameters needed for establishing communications with the particular node, point, terminal or device providing the Internet Protocol based service within the wireless network over a second short-range radio link using a second short-range communication protocol with said second device over the first short-range radio link; and
transmit a service query including at least the received Internet Protocol address for establishing communications with the particular node, point, terminal or device providing the Internet Protocol based service within the wireless network, wherein the service query is transmitted over the second short-range radio link using the second short-range communication protocol on accordance with the negotiated parameters, wherein the second short-range communication protocol is different than the first short-range communication protocol.

17. A device according to claim 16, wherein the device and the second device each include a respective wireless connectivity protocol module that is configured to exchange information needed for the Internet Protocol service, including a Universal Resource Locator plus the name of a service or some other free format text field, so that the device may connect to the Internet Protocol based service via the wireless network.

18. A device according to claim 16, wherein the device and the second device use the short range communication protocol for providing wireless connectivity.

19. A device according to claim 16, wherein the device includes an Internet Protocol service module configured for coupling to the Internet Protocol based service based on the information received from the second device.

20. A device according to claim 19, wherein the first short-range communication protocol is a short range wireless connectivity protocol and a Generic Access Profile is used to authorize an enabled device to use the Internet Protocol based service.

21. A device according to claim 16, wherein the second device includes a wireless Internet Protocol service discovery reply module configured for providing a protocol identifier, Internet Protocol addresses, ports and service specific parameters of a proximity server to the device.

22. A device according to claim 21, wherein the device includes an Internet Protocol service module configured to start a transfer of data between the proximity server via the wireless network.

23. A device according to claim 21, wherein proximity services of the proximity server include a remote screen, a display, loudspeakers or other suitable device accessible as the Internet Protocol based service.

24. A device according to claim 16, wherein the device is either a mobile terminal, a mobile phone, user equipment, a laptop, a notebook computer, a desktop computer, or other suitable device.

25. A device according to claim 16, wherein the device includes a module configured for combining a short range wireless connectivity protocol service discovery to service usage of the wireless network.

26. A device according to claim 16, wherein the device includes a wireless connectivity protocol module that is configured to negotiate an authorization and authentication of the Internet Protocol based service, including Generic Access Profile functionality.

27. A device according to claim 26, wherein the first short-range communication protocol is a short range wireless connectivity protocol.

28. A device according to claim 16, wherein the particular node, point, terminal or device is an Internet Protocol based service user connected via the wireless network to a host device that is not connected to the wireless network.

29. A device according to claim 16, wherein the device includes a wireless Internet Protocol service discovery reply module configured for responding to a corresponding wireless protocol service discovery query from the second device requesting information about the Internet Protocol based service available in the wireless and providing a corresponding reply having information about an Internet Protocol address of a serving device to be used via the wireless network.

30. A network comprising:
a device having one or more modules configured to:
transmit over a first short-range radio link using a first short-range communication protocol a wireless protocol service discovery query requesting information about an Internet Protocol based service available within a wireless network;
receive a reply to the wireless protocol service discovery query from a second device connected to the wireless network over the first short-range radio link using the first short-range communication protocol, the reply including at least an Internet Protocol address of a particular node, point, terminal or device proving the Internet Protocol based service within the wireless network;
negotiate parameters needed for establishing communications with the particular node, point, terminal or device proving the Internet Protocol based service within the wireless network over a second short-range radio link using a second short-range communication protocol with said second device over the first short-range radio link; and transmit a service query including at least the received Internet Protocol address for establishing communications with the particular node, point, terminal or device providing the Internet Protocol based service within the wireless network, wherein the service query is transmitted over the second short-range radio link using the second short-range communication protocol in accordance with the negotiated parameters, wherein the second short-range communication protocol is different than the first short-range communication protocol.

31. A network according to claim 30, wherein the device and the second device exchange information needed for the Internet Protocol based service, including a Universal Resource Locator plus the name of a service or some other free format text field, so that the device may connect to the Internet Protocol based service via the wireless network.

32. A network according to claim 30, wherein the short-range communication protocol is used for providing wireless connectivity between the device and the second device.

33. A network according to claim 30, wherein the device is coupled to the Internet Protocol based service after receiving the information about the Internet Protocol based service available in the wireless network from the second device.

34. A network according to claim 30, wherein the second device provides the protocol identifier, Internet Protocol addresses, ports and service specific parameters of a proximity server to the device.

35. A network according to claim 34, wherein the device starts a transfer of data between the proximity server via the wireless network accessible as an Internet Protocol based service.

36. A network according to claim 35, wherein proximity services of the proximity server include a remote screen, a display, loudspeakers or other suitable device accessible as the Internet Protocol based service.

37. A network according to claim 30, wherein the first short-range communication protocol is a short range wireless connectivity protocol and a Generic Access Profile is used to authorize an enabled device to use the Internet Protocol based service.

38. A network according to claim 30, wherein the device is either a mobile terminal, a mobile phone, user equipment, a laptop, a notebook computer, a desktop computer or other suitable device.

39. A network according to claim 30, wherein a service discovery application protocol of a short range wireless connectivity protocol is combined with service usage of the wireless network.

40. A network according to claim 30, wherein a wireless connectivity protocol is used to negotiate an authorization and authentication of the Internet Protocol based service, including Generic Access Profile functionality.

41. A network according to claim 40, wherein the first short-range communication protocol is a short range wireless connectivity protocol.

42. A network according to claim 30, wherein the particular node, point, terminal or device is an Internet Protocol based service user connected via the wireless network to a host device that is not connected to the wireless network.

43. Apparatus comprising:

means for transmitting from a device over a first short-range radio link using a first short-range communication protocol a wireless protocol service discovery query requesting information about an Internet Protocol based service available within a wireless network;

means for receiving a reply to the wireless protocol service discovery query from a second device connected to the wireless network over the first short-range radio link using the first short-range communication protocol, the reply including at least an Internet Protocol address of a particular node, point, terminal or device providing the Internet Protocol based service within the wireless network;

means for negotiating parameters needed for establishing communications with the particular node, point, terminal or device providing the Internet Protocol based service within the wireless network over a second short-range radio link using a second short-range communication protocol with said second device over the first short-range radio link; and means for transmitting a service query including at least the received Internet Protocol address for establishing communications with the particular node, point, terminal or device providing the Internet Protocol based service within the wireless network, wherein the service query is transmitted over the second short-range radio link using the second short-range communication protocol in accordance with the negotiated parameters, wherein the second short-range communication protocol is different than the first short-range communication protocol.

* * * * *

UNITED STATES PATENT AND TRADEMARK OFFICE
CERTIFICATE OF CORRECTION

| | | |
|---|---|---|
| PATENT NO. | : 7,656,847 B2 | Page 1 of 1 |
| APPLICATION NO. | : 10/880363 | |
| DATED | : February 2, 2010 | |
| INVENTOR(S) | : M. Mela et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

In column 7 at line 53 (claim 16, line 29), please delete "on" and substitute --in-- therefor.

In column 8 at line 47 (claim 29, line 6), after "wireless" please insert --network--.

In column 8 at line 52 (claim 30, line 2), please delete ";".

Signed and Sealed this

Sixteenth Day of November, 2010

David J. Kappos
*Director of the United States Patent and Trademark Office*